United States Patent [19]

Kozima

[11] Patent Number: 5,092,445
[45] Date of Patent: Mar. 3, 1992

[54] APPARATUS FOR SELECTIVELY CONVEYING A PAPER MONEY AND A MAGNETIC CARD

[75] Inventor: Susumu Kozima, Sakado, Japan

[73] Assignee: Kabushiki Kaisha Nippon Conlux, Japan

[21] Appl. No.: 583,599

[22] Filed: Sep. 14, 1990

[30] Foreign Application Priority Data

Sep. 16, 1989 [JP] Japan .................... 1-238378

[51] Int. Cl.$^5$ ............................ G07F 7/04
[52] U.S. Cl. ..................... 194/206; 235/484
[58] Field of Search ............ 194/206, 207, 210; 235/483, 484, 485

[56] References Cited

U.S. PATENT DOCUMENTS

| | | | |
|---|---|---|---|
| 3,831,188 | 8/1974 | Zupancic et al. | 235/485 X |
| 4,301,361 | 11/1981 | Lees | 235/484 |
| 4,733,765 | 3/1988 | Watanabe | 194/206 |
| 4,850,468 | 7/1989 | Kobayashi et al. | 194/207 |
| 4,880,096 | 11/1989 | Kobayashi et al. | 194/206 |
| 5,005,688 | 4/1991 | Yukimoto et al. | 194/206 |

FOREIGN PATENT DOCUMENTS 2747795  5/1978  Fed. Rep. of Germany ...... 235/484
0130097 10/1979  Japan .......................... 194/207

OTHER PUBLICATIONS

IBM Technical Disclosure Bulletin, vol. 18, No. 10, Mar. 1976, p. 3407, Arndt et al., "Synchronous Card Reader", 235-485.

Primary Examiner—Frank E. Werner
Assistant Examiner—Scott L. Lowe
Attorney, Agent, or Firm—Bruce L. Adams; Van C. Wilks

[57] ABSTRACT

An apparatus provided in an automatic vending machine and the like for selectively accepting and conveying a paper money and a magnetic card. The apparatus includes first and second belts driven, respectively, by first and second pulleys having a same radius, a common rotary axis and a space left therebetween; a semicircular convex passage formed on and along the two belts, in a region where the two belts are bent into the form of a semicircular convex by the two pulleys, for selectively conveying the paper money and the card therein and guiding means arranged on and along the convex passage for guiding the paper money and the card in and along the convex passage in cooperation with the two belts so that the paper money and the card are moved while being bent along the convex passage.

15 Claims, 8 Drawing Sheets

APPARATUS FOR SELECTIVELY CONVEYING A PAPER MONEY AND A MAGNETIC CARD

FIELD OF THE INVENTION

The present invention relates to an apparatus provided in an automatic vending machine and the like for selectively accepting and conveying a paper money and a magnetic card which are necessary for using the vending machine and the like.

BACKGROUND OF THE INVENTION

There have been known various kinds of apparatus provided in a vending machine for accepting and conveying a paper money and a magnetic card into the machine through a common inlet. The typical one of such apparatus has been disclosed in the Japanese laid-open utility model application No. 63-114370/1988. This prior apparatus includes a common inlet (1) for introducing a paper money and a magnetic card into a vending machine; a horizontal passage (2) connected to the common inlet (1) for guiding the paper money and the card toward the interior of the vending machine; a pair of regulating plates (3A, 3B) extending parallel to each other and removably mounted on and along the horizontal passage (2) for guiding the card therebetween; a plurality of sets of upper and lower belts (4A, 4B; 5A, 5B; 6A, 6B; 7A, 7B) partially overlapped with each other for inserting therebetween the paper money or the card and conveying the paper money or the card in and along the horizontal passage (2); a pair of optical sensors (8, 9) arranged near the common inlet for sensing each width of the paper money and the card to thereby discriminate the paper money from the card; a set of magnetic heads (10, 11, 12) for detecting the respective magnetic characteristics of the paper money and the card and magnetically writing a purchasing information in the card; and driving means (10A, 10B) for driving the pair of regulating plates (3A, 3B) to fall onto the horizontal passage (2) to thereby form a provisional passage for the card when the optical sensors (8, 9) have sensed the insertion of the card into the the common inlet (1).

However, such prior apparatus has been found to have the following drawbacks. That is, when the card has been concave or convex, it tends to be spaced from the magnetic heads and thereby fails to magnetically sufficiently interact with the magnetic heads, because it is moved in the horizontal passage without pressure vertically applied thereto. In addition, the regulating plates are operative to form the provisional passage for the card in the horizontal passage only when the optical sensors have properly sensed the opposite corners of the card. Consequently, if the card is unsuitably inserted into the common inlet so that the card does not cross one of the two optical sensors, no signal corresponding to the entrance of the card is outputted and accordingly the regulating plates is not operated to form the provisional passage for the card. As the result, the apparatus fails to discriminate the card from the paper money and conveys the card, by mistake, into a chamber for reserving paper moneys.

SUMMARY OF THE INVENTION

It is an object of the invention to remove these drawbacks as noted above with respect to the prior art.

According to the invention, there is provided an apparatus for selectively conveying a paper money and a magnetic card, comprising: (a) a plurality of belts each driven by one of pulleys having a same radius and a common rotary axis and arranged parallel to each other with a space left between each two pulleys adjacent to each other; (b) a semicircular convex passage formed on and along the plurality of belts, in a region where the belts are bent into the form of a semicircular convex by forcedly contacting with the circumferential edges of the pulleys, for selectively conveying the paper money and the magnetic card in the passage, the semicircular convex passage having a constant width not less than a width of the paper money, a common inlet formed at an end thereof for introducing the paper money and the magnetic card into the passage and an outlet formed at the opposite end thereof for discharging the paper money out of the passage; (c) guiding means arranged on and along the semicircular convex passage for guiding the paper money and the magnetic card in and along the convex passage in cooperation with the belts being driven so that the paper money and the magnetic card are moved while forcedly contacting their respective lower surfaces with the belts; (d) sensing and discriminating means disposed in the semicircular convex passage for optically sensing each insertion of the paper money and the magnetic card into the common inlet of the passage and for magnetically discriminating the paper money from the magnetic card in the passage; and (e) an adjusting mechanism actuated in response to an output signal from the sensing and discriminating means for selectively adjusting the semicircular convex passage so that, on the one hand, only the magnetic card is allowed to enter into the passage by placing an adjusting plate in and along the passage and, on the other hand, the paper money is allowed to enter into the passage and move to the outlet of the passage by displacing the adjusting plate out of the passage.

The invention is characterized in that the magnetic card being moved in the semicircular convex passage is forcedly bent into the form of a convex and thereby it is facilitated to closely contact with or approach the sensing faces of magnetic sensors of the sensing and discriminating means even if it is uneven or warped.

Preferably each magnetic sensor of the sensing and discriminating means is provided with a roller having a rotary axis thereof perpendicular to the convex passage for contacting the magnetic card or the paper money with the sensing face of the magnetic sensor. Also, the adjusting mechanism further has a movable shutter for stopping any abnormal insertions of the paper money and the magnetic card into the passage when optical sensors of the sensing and discriminating means have not sensed the proper entrances of the paper money and the magnetic card.

DESCRIPTION OF PREFERRED EMBODIMENTS

FIGS. 1 to 7 show the first embodiment of an apparatus according to the invention.

Figure 1:
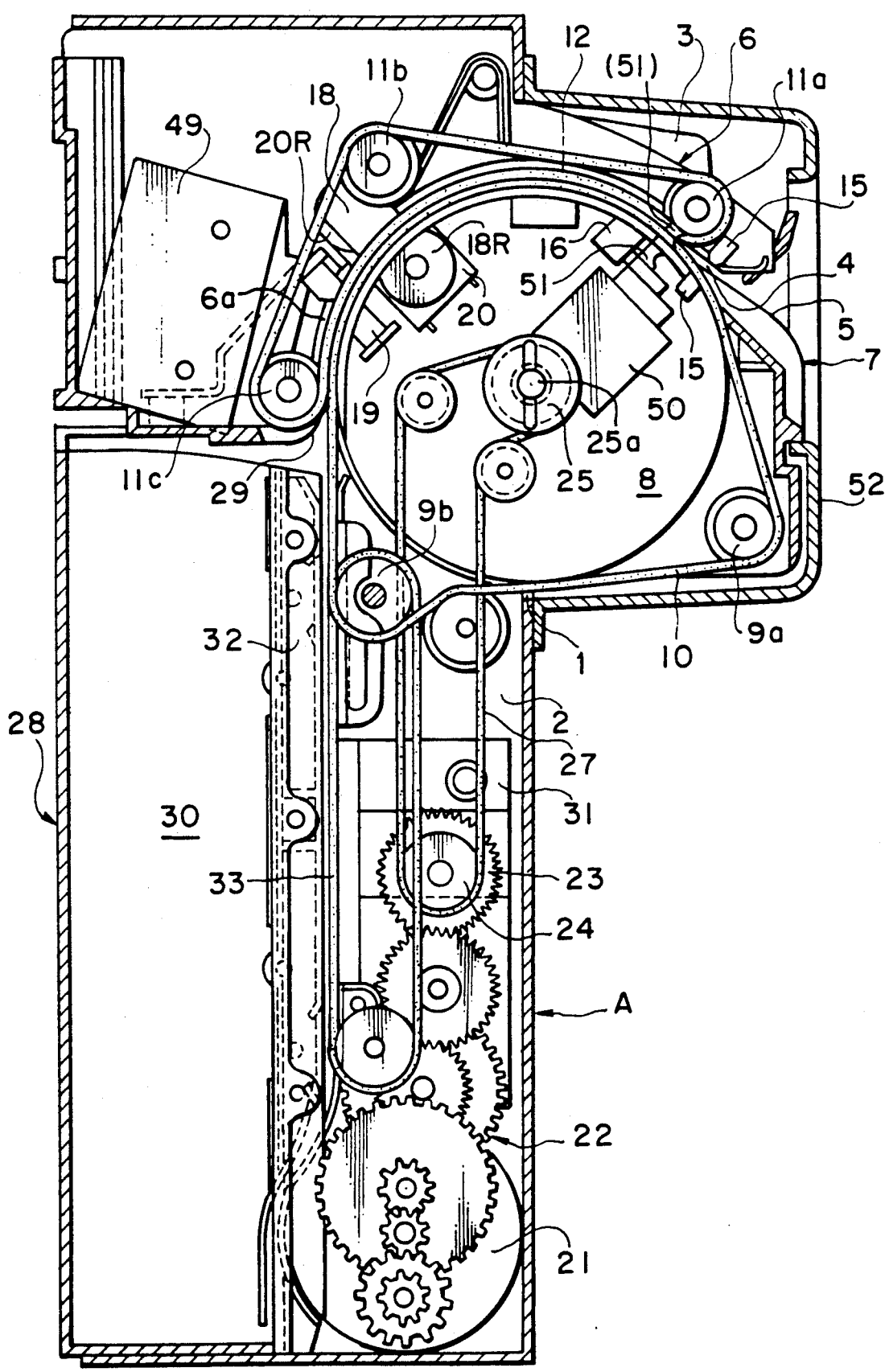
FIG. 1 is a vertical sectional view of the first preferred embodiment of an apparatus according to the invention.

Referring to FIG. 1, the symbol A designates a vertically elongated housing for accommodating therein the apparatus which selectively accepts and conveys a paper money and a magnetic card. The housing A has an opening 1 in a front upper portion thereof and right and left side plates 2, 2 which protrude ahead at the opening 1 to form fixing members 3, 3 for fixing the apparatus in the housing A. The apparatus is provided in the opening space 1 between the right and left side plates 2, 2 and has upper and lower guide members 6 and 7. The upper and lower guide members 6 and 7 have portions which are opposed to each other to form a semicircular convex space 4 therebetween. The semicircular convex space 4 has openings at the opposite ends thereof.

In the lower guide member 7 are disposed a pair of main pulleys 8 and 8 having a same radius and a common rotary axis 25a and arranged parallel to each other with a gap left therebetween. The main pulleys 8 are rotated by a motor 21 through a gearing mechanism 22, a driving pulley 24, a driving belt 27 and a pulley 25 secured to the common rotary axis 25a. First and second lower belts 10 and 10 are led under tension through the respective one of the main pulleys 8 and 8 and subsequently led through a pair of subpulleys 9a and 9a and a pair of subpulleys 9b and 9b. The portions semicircularly bent by the respective main pulleys 8 and 8 of the first and second lower belts 10 and 10 are protruded over the lower guide member 7 through a notched portion formed in an upper surface of the lower guide member and extend in and along the semicircular convex space 4. In the upper guide member 6 are provided first and second upper belts 12 and 12 each of which is led under tension through the respective one of two pulleys 11a and 11a, two pulleys 11b and 11b and two pulleys 11c and 11c. The first and second upper belts 12 and 12 are forcedly overlapped, respectively, with the semicircularly bent portions of the first and second lower belts 10 and 10 so as to be moved with the first and second lower belts driven by the first and second main pulleys 8 and 8.

In and along the semicircular convex space 4 is formed a semicircular convex passage for selectively conveying therein the paper money and the magnetic card. The semicircular convex passage is formed between the mutually overlapped portions of the first upper and lower belts 10 and 12, between the mutually overlapped portions of the second upper and lower belts 10 and 12 and between a pair of side plates 6a and 6b provided with the upper guide member 6 (see FIGS. 4a and 4b). The side plates 6a and 6b are arranged parallel to each other with a distance therebetween which is substantially equal to a shorter width of the paper money and to extend outside of and along the mutually overlapped portions between the first upper and lower belts and between the second upper and lower belts. The convex passage has, at one opening of the semicircular convex space 4, a common inlet 5 for introducing the paper money and the magnetic card into the passage and an outlet 29 at the other opening for discharging the paper money out of the passage. The paper money or the magnetic card inserted into the common inlet 5 is tightly interposed between the two upper belts 12 and 12 and the two lower belts 10 and 10 and moved with these belts along the passage while being bent by these belts.

Figure 2:
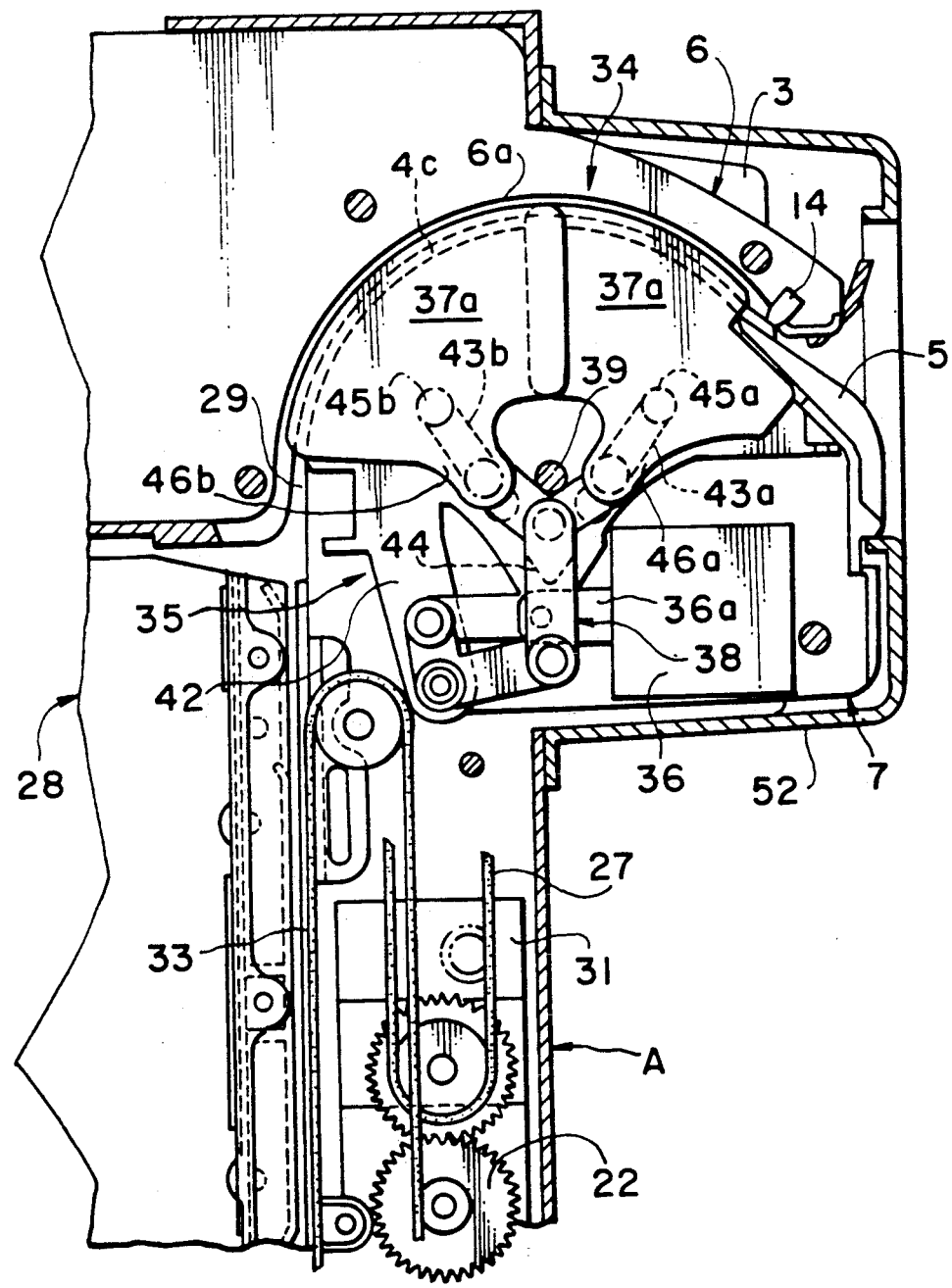
FIG. 2 is a view showing an operated state of the apparatus shown in FIG. 1.
Figure 3:
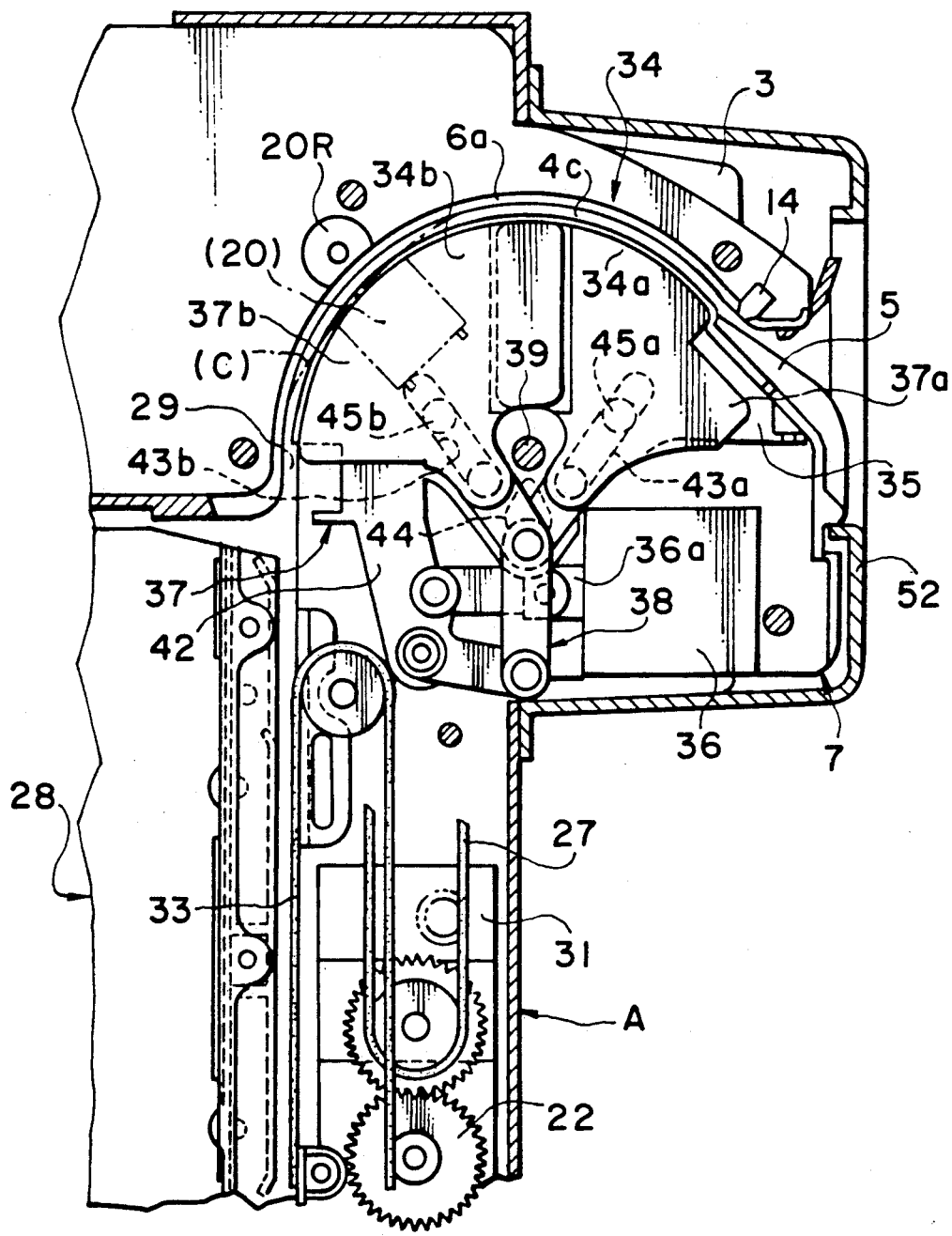
FIG. 3 is a view showing another operated state of the apparatus shown in FIG. 1.

Referring to FIGS. 2, 3, 5 and 6, a vertical base plate 35 is fixed to the lower guide member 7 so as to stand under and parallel to the semicircular convex space 4, and a pair of adjusting plates 37a and 37b having a fan-like shape are slidably mounted, respectively, on the front and rear sides of one of the opposite surfaces of the vertical base plate 35 so as to be movable up and down. The vertical base plate 35 has a semicircular plate portion 40 and a bearing plate portion 42 protruded downward from the left or rear side of the semicircular plate portion 40. In the plate portion 40 are formed an axial hole 39 for slidably inserting therein the common rotary axis 25a of the main pulleys 8 and 8, a pair of guide slots 43a and 43b and another guide slot 44 positioned in a center protrusion 41 of the plate portion 40. Each of the adjusting plates 37a and 37b has a slide axis 45a (45b) thereon which is slidably inserted into the guide slot 43a (43b) and an arcuate upper edge portion 34a (34b) which is inserted into and along the semicircular convex space 4 and protruded over the semicircular convex passage when the adjusting plate 37a (37b) is displaced upwards by an electromagnetic actuator 36 through a link mechanism 38. The electromagnetic actuator 36 has a plunger 36a. The link mechanism 38 includes a pivotal lever the pivot axis of which is borne in the bearing plate portion 42 of the vertical base plate 35, and linking means for linking the one end of the pivotal lever with the plunger 36a and the other end of the pivotal lever with the respective pivot portions 46a and 46b of the adjusting plates 37a and 37b so as to convert the movement of the plunger into vertically oblique displacements of the adjusting plates. FIGS. 2 and 3 show sectional views of the apparatus when the pair of adjusting plates 37a and 37b are displaced upwards and when the adjusting plates are displaced downward, respectively.

Figure 4A:
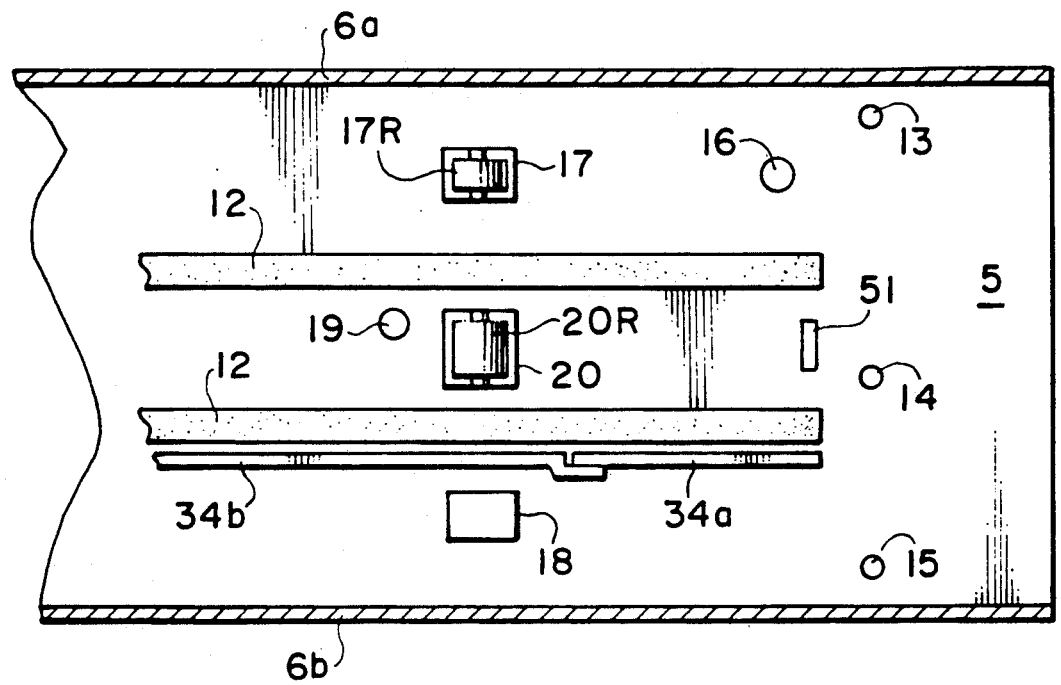
FIGS. 4a and 4b are fragmentary development views of the face and back sides, respectively, of a semicircular convex passage formed in the apparatus shown in FIGS. 1 to 3.
Figure 4B:
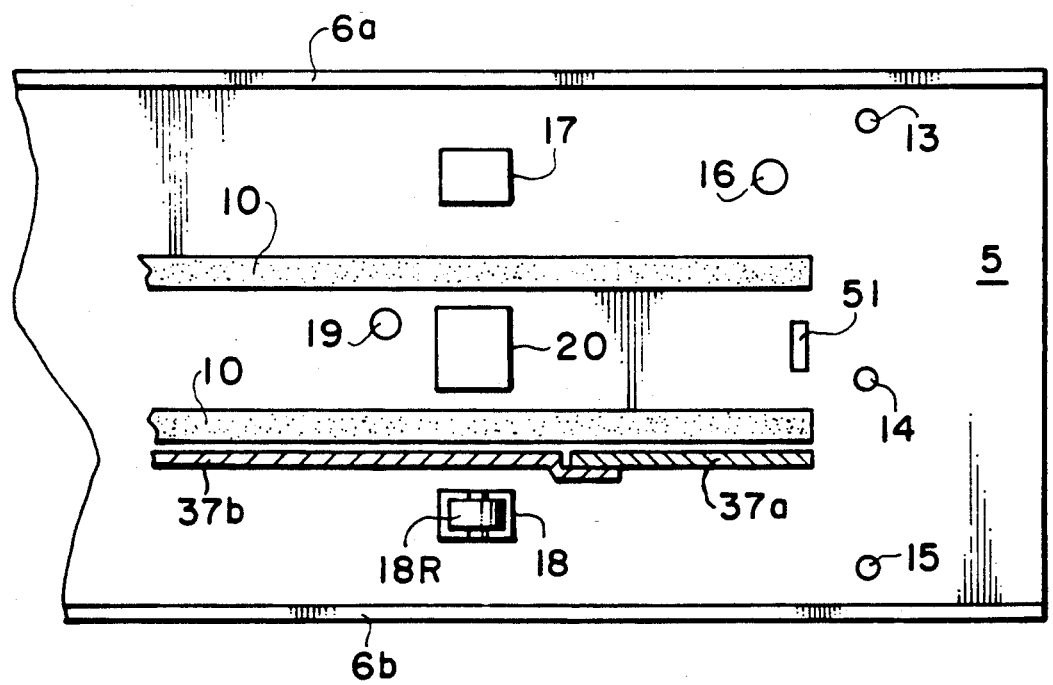
Figure 5:
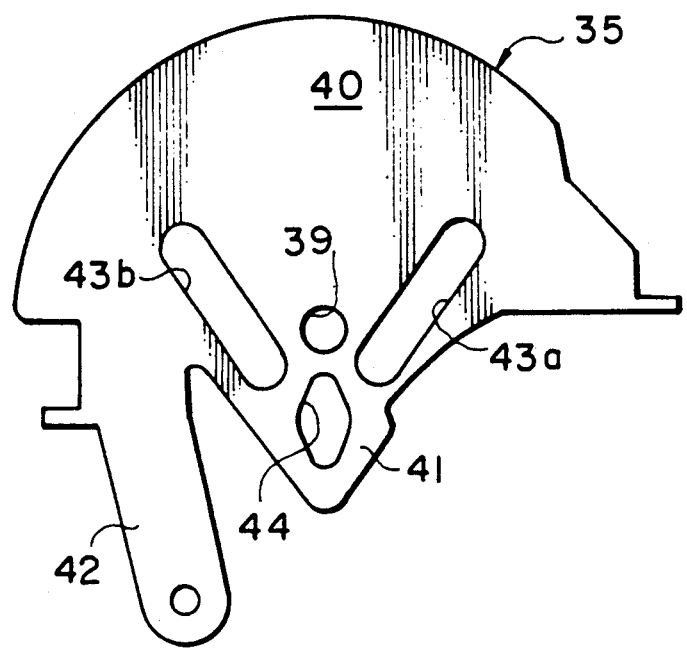
FIG. 5 is an elevational view of a vertical base plate disposed in the apparatus shown in FIGS. 2 and 3.
Figure 6:
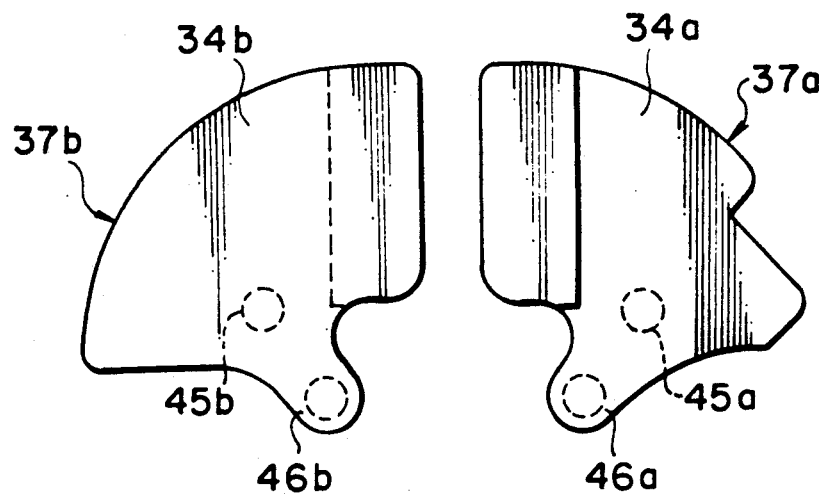
FIG. 6 is an elevational view of a pair of adjusting plates arranged in the apparatus shown in FIGS. 2 and 3.

Referring to FIGS. 4a and 4b, the first and second upper belts 12 and 12 are overlapped with the first and second lower belts 10 and 10, respectively, and these mutually overlapped portions run between the side plate 6a and the upper edge portions 34a and 34b of the adjusting plates 37a and 37b standing adjacent to each other and side by side. The distance between the side plate 6a and the upper edge portion 34a or 34b is determined to be substantially equal to a shorter width of the magnetic card.

In the semicircular convex passage near the common inlet 5 are arranged a set of sensors 13, 14 and 15 for optically sensing each of the shorter widths of the paper money and the magnetic card and also a movable shutter 51. The sensors 13, 14 and 15 are operative to sense the respective one of the opposite corners of the paper money and the magnetic card, the other one of the opposite corners of the magnetic card and the other one of the opposite corners of the paper money, respectively. The shutter 51 is operative to stop any abnormal insertions of the paper money and the magnetic card into the convex passage when the sensors 13 to 15 have not sensed the proper entrances of the paper money and the magnetic card. That is, the shutter 51 remains in and over the passage, unless the apparatus is operated, but is moved under the passage only when the sensors 13 to 15 have just sensed the proper entrance of the paper money or the magnetic card. Also, optical sensors 16 and 19 are disposed for sensing a thickness of the magnetic card entered into the convex passage and for sensing the paper money or the magnetic card being passing in a middle portion of the convex passage, respectively.

In addition, magnetic sensors 17 and 18 and a magnetic head 20 are arranged in the convex passage between the shutter 51 and the sensor 16. The magnetic sensors 17 and 18 are operative not only to sense the respective magnetic characteristics of the paper money and the magnetic card but also to examine each genuineness of the paper money and the magnetic card. The magnetic head 20 is operative to read magnetic memories written in the magnetic card and to magnetically write a new purchasing information into the magnetic card. Preferably the magnetic sensors 17 and 18 and the magnetic head 20 are provided, respectively, with rollers 17R, 18R and 20R having rotary axes thereof perpendicular to the convex passage for forcedly contacting the paper money or the magnetic card with sensing faces of the magnetic sensors and the magnetic head. By such rollers, even if the paper money and the magnetic card have been uneven or warped, they are facilitated to magnetically effectively interact with the magnetic sensors 17 and 18 and the magnetic head 20 in cooperation with the two sets of the upper and lower belts 12 and 10.

Figure 7:
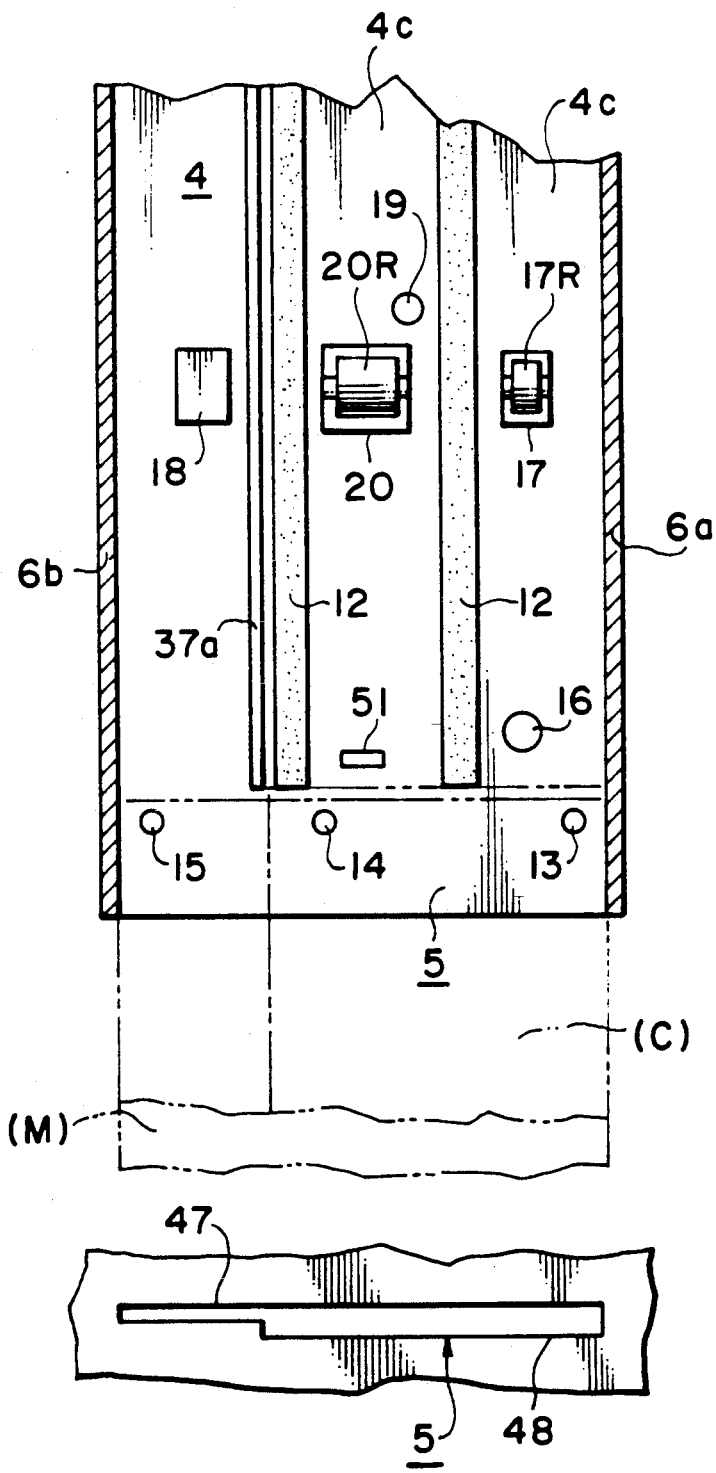
FIG. 7 is a view showing a structural relationship of a common inlet of the semicircular convex passage with a semicircular convex space formed in the apparatus shown in FIGS. 1 to 3.

Referring to FIG. 7, the common inlet 5 for introducing the paper money M and the magnetic card C into the semicircular convex passage is formed at the inlet 5 of the semicircular convex space 4. The common inlet 5 is comprised of a longer slit portion 47 for accepting the paper money M and a shorter slit portion 48 for accepting the magnetic card C. The slit portion 47 has a horizontal width substantially equal to the shorter width of the paper money M. The slit portion 48 has a horizontal width and a thickness which are substantially equal to the shorter width of and the thickness of the magnetic card C, respectively. As shown in the drawing, the slit portions 47 and 48 have a common slit end thereof, and the slit portion 47 extends in and through the slit portion 48. Generally, unless the optical sensors 13 and 15 have sensed the insertion of the paper money M through the slit portion 47, the adjusting plate 37a (37b) is sustained to position its upper edge portion 34a (34b) over the upper belts 12 in the semicircular convex space 4 and forms a provisional semicircular convex space 4c, in which the magnetic card is guided to move, in combination with the side plate 6a. The front end near the optical sensor 14 of the adjusting plate 37a is effective to stop any abnormal insertion of the magnetic card as well as the paper money when the optical sensors 13 and 15 have not sensed the insertion of the paper money.

Referring again to FIG. 1, when the paper money M is properly inserted into the semicircular convex passage through the common inlet 5, the paper money covers the optical sensors 13, 14 and 15, and the covered sensors 13 and 15 sense an inserted material as the paper money and make an output signal corresponding to the entrance of the paper money. In response to this output signal, the motor 21 is driven to rotate the pair of pulleys 8, and the electromagnetic actuator 36 is actuated to move the pair of adjusting plates 37a and 37b downward so that the upper edge portions 34a and 34b of the adjusting plates are displaced under the lower belts 10 semicircularly bent by the pulleys 8. At the same time, an electromagnetic solenoid 50 is actuated to displace the shutter 51 under the lower belts 10. Then, the paper money M is inserted to be interposed between the two upper belts 12 and the two lower belts 10 and subsequently moved with these four belts toward the outlet 29. The paper money is moved to be closely contacted with the magnetic sensors 17 and 18 and the magnetic head 20 by the rollers 17R, 18R and 20R and checked with the sensor 18 whether the paper money is true or not. When the paper money has been confirmed true with the sensor 18, it is discharged from the outlet 29 and subsequently introduced into a device 28 for receiving paper moneys. The device 28 is operated by a motor 21 through the gearing mechanism 22. The device 28 includes a pair of belts 33 parallel to each other for conveying the paper money from the outlet 29 to a stacking place in the device, a stacking plate 32 for stacking the paper moneys conveyed to the stacking place in a piled state and a stock chamber 30 for stocking the paper moneys therein. On the other hand, if the sensor 18 has sensed the paper money as a counterfeit one or a material other than money, the paper money is moved back and discharged out of the inlet 5 in response to a signal from the sensor 18. After the paper money has been discharged from the outlet 29 or moved back and discharged from the inlet 5, the electromagnetic actuator 36 is released from its actuation and accordingly the pair of adjusting plates 37a and 37b are displaced upwards again.

Next, when the magnetic card C is properly inserted into the semicircular convex passage through the common inlet 5, the optical sensors 13 and 14 are covered with the magnetic card and generate a signal corresponding to the entrance of the magnetic card. In response to this signal, the shutter 51 is displaced under the lower belts 10 and thereby the magnetic card is allowed to further enter into the convex passage so as to be interposed between the two upper belts 12 and the two lower belts 10. In this case, the electromagnetic actuator 36 is not actuated, and accordingly the upper edge portions 34a and 34b of the adjusting plates 37a and 37b remain protruding over the upper belts 12. The magnetic card is moved with these four belts, checked with the sensor 16 about whether or not the magnetic card has a thickness corresponding to a true magnetic card and then closely contacted with the magnetic sensor 17 and the magnetic head 20 by the rollers 17R and 20R. The magnetic sensor 17 checks whether the magnetic card is magnetically genuine or not. The magnetic head 20 reads the past record of the magnetic card and magnetically writes a new purchasing information into the card. After the magnetic card has magnetically interacted with the sensor 17 and the head 20, a punching device 49 punches a purchasing mark on the magnetic card, and then the magnetic card is moved back with the four belts 10 and 12 by conversely rotating the pulleys 8 and discharged out of the apparatus through the common inlet 5.

Figure 8A:
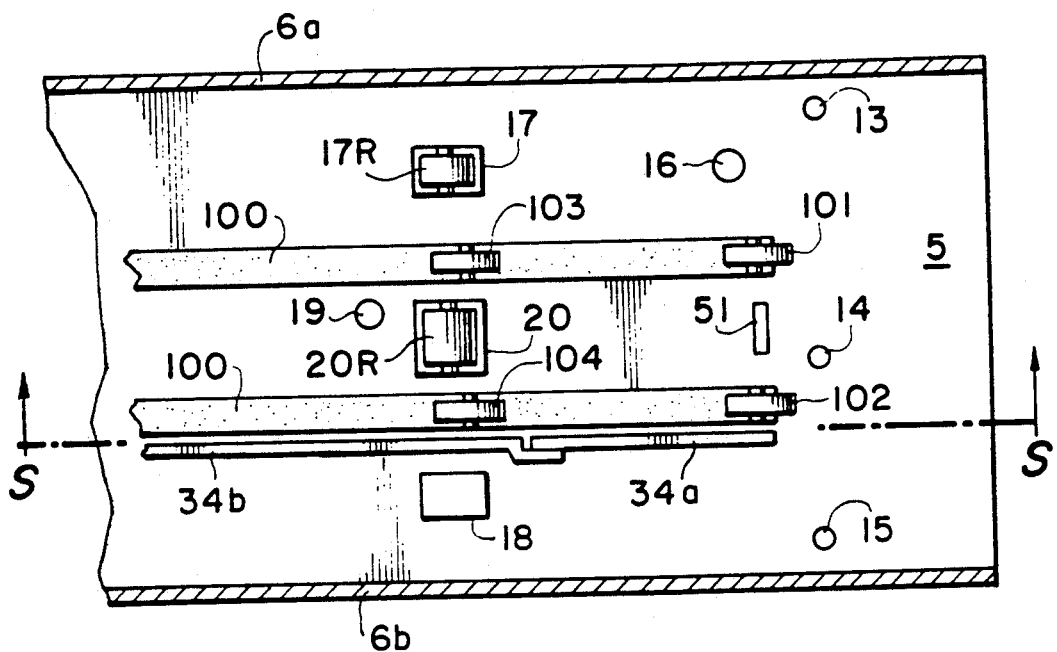
FIGS. 8a and 8b are fragmentary development views of the face and back sides, respectively, of a semicircular convex passage formed in the second preferred embodiment of the apparatus according to the invention.
Figure 8B:
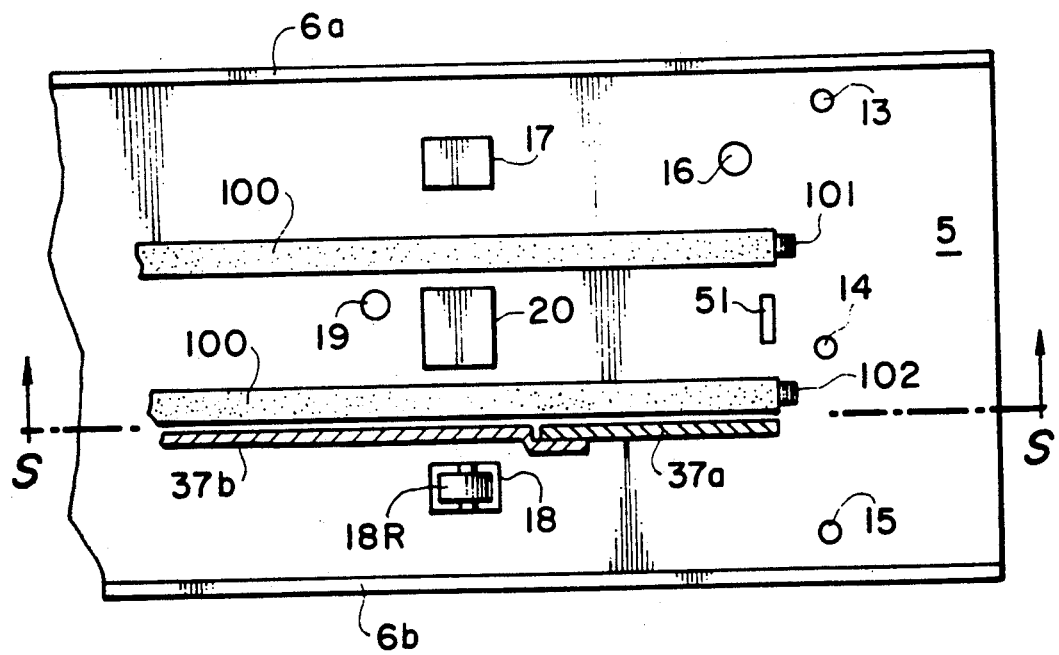
Figure 9:
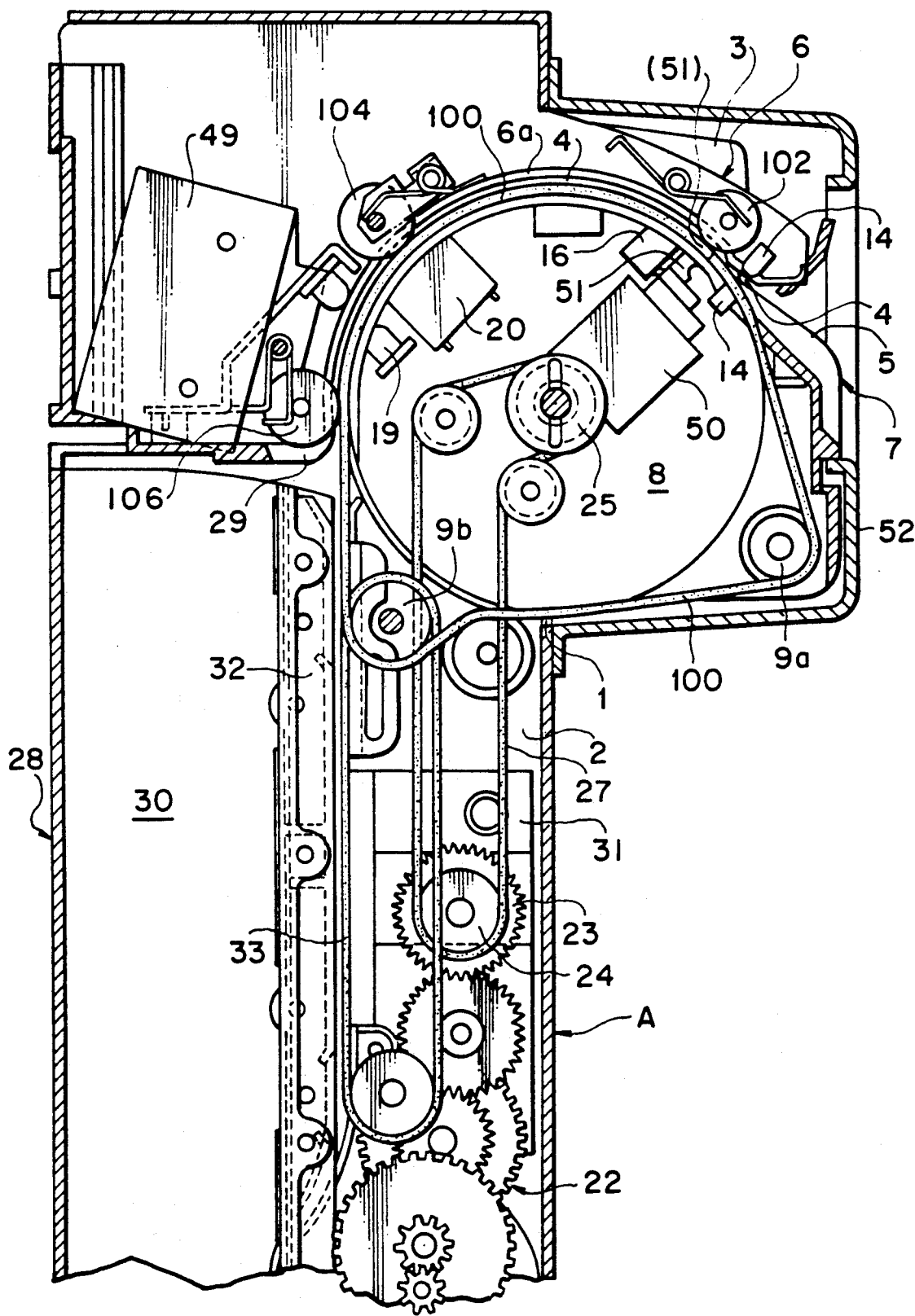
FIG. 9 is a vertical sectional view, taken along line S—S of FIGS. 8a and 8b, of the second preferred embodiment of the apparatus according to the invention.

FIGS. 8a, 8b and 9 show the second embodiment of the apparatus according to the invention, wherein the same reference characters as those in FIGS. 1 to 7 designate identical parts or portions in the first embodiment.

Referring to these drawing and compared with FIGS. 1 to 7, three first rollers and three second rollers are used, respectively, instead of the first and second upper belts 12 and 12 in the first embodiment of the apparatus. That is, the first rollers 101, 103 and 105 and the second rollers 102, 104 and 106 are arranged, respectively, on first and second belts 100 and 100 corresponding to the first and second lower belts 10 and 10 in the first embodiment on the apparatus, wherein the first and second belts are semicircularly bent by the main pulleys 8 and 8. Each of these first and second rollers has a rotary axis perpendicular to the first and second belts 100 and a spring means for rotatably urging the roller against the first or second lower belt. In such manner, all of the rollers are forcedly contacted with the belts 100 and rotated by the belts being moved.

As shown in FIGS. 8a to 9, the first and second rollers 101 and 102 are positioned near the common inlet 5 and the rollers 105 and 106 near the outlet 29. The first and second rollers 103 and 104 are positioned nearly halfway between the inlet 5 and the outlet 29 and preferably near the magnetic head 20 and the magnetic sensor 17. Generally the distances along the first and second belts 100 between the first rollers 101 and 103 and between the second rollers 102 and 104 are determined to be less than a longer width of the magnetic card to thereby enable a forward end of the magnetic card being moved between the belts 100 and the first and second rollers 101 and 102 to reach the next first and second rollers 103 and 104. Portions semicircularly bent by the main pulleys 8 of the first and second belts 100 and the pair of side plates 6a and 6b form a semicircular convex passage for the paper money and the magnetic card in cooperation with all of the rollers 101 to 106. That is, the paper money or the magnetic card is successively interposed between the pair of belts 100 and each pair of first and second rollers (101, 102; 103, 104; 105, 106) and moved with the belts.

Preferably the above-mentioned guiding means of the apparatus further includes an auxiliary means disposed over and along the semicircular convex passage for guiding the forward end of the magnetic card being moved so as to be interposed between the pair of belts 100 and the first and second rollers next to those just urging and forwarding the magnetic card. The auxiliary means includes a convex band plate (not shown in the drawings) attached to the upper guide member 6 and extending over and along the semicircular convex passage with a clearance therebetween or a pair of semicircular convex flanges (not shown in the drawings) formed, opposite to each other, on and along an upper edge of the side plate 6a and upper edges of the adjusting plates 37a and 37b. The convex band plate and the pair of flanges are operative to slidably forcedly contact with the forward end of the magnetic card being moved and the opposite corners of said forward end, respectively, to thereby bend the magnetic card along the convex passage and successively interpose the magnetic card between the pair of belts 100 and each pair of the first and second rollers.

Also, it is preferable to provide additional first and second rollers on the belts 100 between the common inlet 5 and the outlet 29 so that the magnetic card can be successively guided under each pair of the first and second rollers without the auxiliary means.

The apparatus of the second embodiment has the same structure and functions as that of the first embodiment except the above-mentioned features with respect to the second embodiment.

What is claimed is:

1. An apparatus for selectively conveying a paper money and a magnetic card, comprising:

a plurality of belts each driven by one of a plurality of pulleys having a same radius and a common rotary axis and arranged parallel to each other with a space left between each two pulleys adjacent to each other;

a semicircular convex passage formed on and along the plurality of belts, in a region where the belts are bent into the form of a semicircular convex by forcedly contacting with the circumferential edges of the pulleys, for selectively conveying the paper money and the magnetic card in the passage, the semicircular convex passage having an adjustably settable constant width not less than a width of the paper money, a common inlet formed at an end thereof for introducing the paper money and the magnetic card into the passage and an outlet formed at the opposite end thereof for discharging the paper money out of the passage;

guiding means arranged on and along the semicircular convex passage for guiding the paper money and the magnetic card in and along the convex passage in cooperation with the belts being driven so that the paper money and the magnetic card are moved while forcedly contacting their respective lower surfaces with the belts;

sensing and discriminating means disposed in the semicircular convex passage for optically sensing each insertion of the paper money and the magnetic card into the common inlet of the passage and for magnetically discriminating the paper money from the magnetic card in the passage; and an adjusting mechanism actuated in response to an output signal from the sensing and discriminating means for selectively adjusting the constant width of the semicircular convex passage so that, on the one hand, only the magnetic card is allowed to enter into the passage by placing an adjusting plate in and along the passage and, on the other hand, the paper money is allowed to enter into the passage and move to the outlet of the passage by displacing the adjusting plate out of the passage.

2. The apparatus according to claim 1, wherein the plurality of belts comprise first and second lower belts driven, respectively, by first and second pulleys having a same radius and a common axis and arranged parallel to each other with a space left therebetween; and the guiding means comprise first and second upper belts forcedly overlapped, respectively, with the first and second lower belts in the region where the first and second lower belts are bent into the form of a semicircular convex by forcedly contacting with the circumferential edges of the first and second pulleys; and the semicircular convex passage is formed between the mutually overlapped portions of the first upper and lower belts, between the mutually overlapped portions of the second upper and lower belts and between a pair of parallel side plates opposite to each other and disposed to extend outside of and along said overlapped portions.

3. The apparatus according to claim 2, wherein the adjusting mechanism comprises a vertical base plate fixedly disposed under and parallel to the semicircular convex passage; said adjusting plate slidably mounted on the vertical base plate and movable up and down and having an upper edge portion thereof which is inserted into and protruded over the convex passage when said adjusting plate is displaced upwards, the distance between the upper edge portion and one of the side plates of the passage being determined to be not less than a width of the magnetic card; an electromagnetic actuator having a plunger and actuated in response to the output signal from the sensing and discriminating means; and a link mechanism for linking said adjusting plate with the plunger so as to convert the movement of the plunger into the vertically oblique displacement of said adjusting plate.

4. The apparatus according to claim 2, wherein the sensing and discriminating means comprises a set of optical sensors arranged near the common inlet of the semicircular convex passage and in the width direction of the convex passage for optically sensing the respective opposite corners of the paper money and the magnetic card which are entered into the common inlet; and a pair of magnetic sensors arranged in the passage between the optical sensors and the outlet of the passage for sensing the respective magnetic characteristics of the paper money and the magnetic card, each of the magnetic sensors being provided with a roller having a rotary axis thereof perpendicular to the passage for forcedly contacting the paper money or the magnetic card with a sensing face of the magnetic sensor.

5. The apparatus according to claim 4, wherein the set of optical sensors comprise first, second and third sensors arranged with each other so that the first, second and third sensors are positioned to sense the respective one of the opposite corners of the paper money and the magnetic card which are entered into the semicircular convex passage, the other one of the opposite corners of the magnetic card and the other one of the opposite corners of the paper money, respectively.

6. The apparatus according to claim 2, wherein the adjusting mechanism further comprises a shutter provided in the semicircular convex passage near the common inlet and movable up and down for stopping any abnormal insertions of the paper money and the magnetic card into the passage when the sensors have not sensed entrance of the paper money or the magnetic card into the passage.

7. The apparatus according to claim 2, wherein the mutually overlapped portions of the first upper and lower belts and of the second upper and lower belts extend between the upper edge portion of said adjusting plate and the side plate spaced apart from the upper edge portion by a distance not less than a width of the magnetic card.

8. The apparatus according to claim 1, wherein the adjusting mechanism further comprises a shutter provided in the semicircular convex passage near the common inlet and movable up and down for stopping any abnormal insertions of the paper money and the magnetic card into the passage when the sensors have not sensed entrance of the paper money or the magnetic card into the passage.

9. The apparatus according to claim 1, wherein the plurality of belts comprise first and second belts driven, respectively, by first and second pulleys having a same radius and a common rotary axis and arranged parallel to each other with a space left therebetween; and the guiding means comprise a plurality of first rollers and a plurality of second rollers, the first and second rollers having their respective axes perpendicular to the first and second belts and being rotatably forcedly contacted with the first belt and the second belt, respectively, in the region where the first and second belts are bent into the form of a semicircular convex by forcedly contacting with the circumferential edges of the first and second pulleys, the respective distances along the first and second belts between the first rollers adjacent to each other and between the second rollers adjacent to each other being determined to be less than a width of the magnetic card; and the semicircular convex passage is formed between all of the first and second rollers and the semicircularly convex portions of the first and second belts and between a pair of parallel side plates opposite to each other and disposed to extend outside of and along said semicircular convex portions.

10. The apparatus according to claim 9, wherein the adjusting mechanism comprises a vertical base plate fixedly disposed under and parallel to the semicircular convex passage; said adjusting plate slidably mounted on the vertical base plate and movable up and down and having an upper edge portion thereof which is inserted into and protruded over the passage when said adjusting plate is displaced upwards, the distance between the upper edge portion and one of the side plates of the passage being determined to be not less than a width of the magnetic card; an electromagnetic actuator having a plunger and actuated in response to the output signal from the sensing and discriminating means; and a link mechanism for linking said adjusting plate with the plunger so as to convert the movement of the plunger into the vertically oblique displacement of said adjusting plate.

11. The apparatus according to claim 9, wherein the sensing and discriminating means comprises a set of optical sensors arranged near the common inlet of the semicircular convex passage and in the width direction of the convex passage for optically sensing the respective opposite corners of the paper money and the magnetic card which are entered into the common inlet; and a pair of magnetic sensors arranged in the passage between the optical sensors and the outlet of the passage for sensing the respective magnetic characteristics of the paper money and the magnetic card, each of the magnetic sensors being provided with a roller having a rotary axis thereof perpendicular to the passage for forcedly contacting the paper money or the magnetic card with a sensing face of the magnetic sensor.

12. The apparatus according to claim 11, wherein the set of optical sensors comprises first, second and third sensors arranged with each other so that the first, second and third sensors are positioned to sense the respective one of the opposite corners of the paper money and the magnetic card which are entered into the semicircular convex passage, the other one of the opposite corners of the magnetic card and the other one of the opposite corners of the paper money, respectively.

13. The apparatus according to claim 9, wherein the adjusting mechanism further comprises a shutter provided in the semicircular convex passage near the common inlet and movable up and down for stopping any abnormal insertions of the paper money and the magnetic card into the passage when the sensors have not sensed entrance of the paper money or the magnetic card into the passage.

14. The apparatus according to claim 9, wherein the first and second belts extend between the upper edge portion of said adjusting plate and the side plate spaced apart from the upper edge portion by a distance not less than a width of the magnetic card.

15. The apparatus according to claim 14, wherein the guiding means further comprise means disposed over and along the semicircular convex passage with a clearance therebetween for guiding a forward end of the magnetic card being moved so as to be interposed between the first and second belts and the first and second rollers next to those just urging and forwarding the magnetic card.

* * * * *